United States Patent [19]

Bass

[11] Patent Number: 5,099,638
[45] Date of Patent: Mar. 31, 1992

[54] TRI-BLADE YARD RAKE

[75] Inventor: Michael C. Bass, 131 St. Charles Ave., Biloxi, Miss. 39530

[73] Assignee: Michael C. Bass, Biloxi, Miss.

[21] Appl. No.: 685,297

[22] Filed: Apr. 12, 1991

[51] Int. Cl.[5] .......................................... A01D 07/06
[52] U.S. Cl. ................................ 56/400.16; 56/400.17
[58] Field of Search ........... 56/400.16, 400.17, 400.18, 56/400.04, 400.05

[56] References Cited

U.S. PATENT DOCUMENTS

| | | | |
|---|---|---|---|
| 1,115,881 | 11/1914 | West | 56/400.04 |
| 1,577,065 | 3/1926 | Fuller . | |
| 1,925,357 | 7/1933 | Withington | 56/400.18 |
| 2,146,264 | 2/1939 | McKenzie | 56/400.16 |
| 2,707,366 | 0/1955 | Gartner | 56/400.17 |
| 2,748,557 | 6/1956 | Eadie | 56/400.16 |
| 2,883,820 | 0/1959 | Bissell | 56/400.17 |
| 3,332,223 | 7/1967 | Polisso | 56/400.17 |
| 3,999,244 | 12/1976 | Brickley | 15/142 |
| 4,150,528 | 4/1979 | Rendin | 56/400.18 |
| 4,351,145 | 9/1982 | Farkas | 56/400.19 |
| 4,744,208 | 5/1988 | King | 56/400.17 |

FOREIGN PATENT DOCUMENTS

| | | | |
|---|---|---|---|
| 1928406 | 12/1970 | Fed. Rep. of Germany | 56/400.16 |
| 125244 | 6/1949 | Sweden | 56/400.16 |

*Primary Examiner*—Terry Lee Melius

[57] ABSTRACT

The present invention relates to a rake head for a lawn or garden having three rows (4, 5, and 6) of tines arranged in front to rear staggered fashion. The rake head includes a main frame support member (2) containing a dogleg socket (3) for attaching an elongated handle (1), and the first row of tines (4). The second plane (FIG. 3) has alternating shank (10, 11) portions which create a first and second group of tines. This grouping combined with main frame (2) creates three rows of tines (4, 5, and 6) on a dual planed (FIG. 1) raking implement.

3 Claims, 2 Drawing Sheets

TRI-BLADE YARD RAKE

BACKGROUND OF THE INVENTION

A rake is a tined implement which is used for drawing together loose grass clippings or leaves and for making a surface loose or smooth. The hand held rake is an ancient farming and gardening invention which has been used for many centuries. The multiple blade rake of this invention is classified in the class 56/400.16, 56/400.17 and the like.

U.S. Pat. No. 1,925,357 discloses a rake with individually adjustable tines that may be set in any of three positions or may be removed.

U.S. Pat. No. 3,332,223 discloses a rake with two rows of tines. There is an indentation in the rake head which acts to bend each tine of the second row into a lower orientation which causes an inequality in the tension exerted. The range of movement in the second row is restricted by the first.

U.S. Pat. No. 4,150,528 discloses an adjustable tine rake with U-shaped tines that can achieve variable stiffness.

U.S. Pat. No. 4,744,208 discloses a two row rake similar to U.S. Pat. No. 4,351,145 hand rake where one row of tines passes through another row with removable tines.

Present day rakes have many similarities but there is no known three bladed yard rake known by the inventor in the prior art. However, previously known rake heads containing plural rows of tines have not proven to be fully successful because of a number of drawbacks and inefficiencies. It is therefor an object of the present invention to provide a rake head for a lawn or garden that overcomes the problems and deficiencies of the prior art.

SUMMARY OF THE PRESENT INVENTION

The present invention relates to a rake head for a lawn or garden. More particularly, the present invention relates to a rake head having dual planed tri-laterally, front to rear staggered tines sets of which the following taken in connection with its drawings is a description.

My invention has for its object the production of a tri-bladed yard rake more specifically of a type that is one on top of the other with tines off set. The object of my invention is to make the job of raking leaves more efficient by raking more leaves with less strokes. My invention is of a simple case, mechanical in nature involving a novel combination of elements and parts. When raking leaves the advantage of the novel construction is that the leaves that escape through the first row of tines or the second row of tines will eventually be caught by the third row thus producing a synergism and in fulfilling its object. Rakes of the prior art suffer from incomplete raking, single row and double row, require a greater number of strokes to effectively remove the leaves and debris from ones garden or lawn; i.e., leaf reduction per stroke with less strokes.

Furthermore, it is an object and advantage that the whole rake head including all tines and main support member be comprised of metal. The reason being, although one could make it of all polymer or half polymer and half metal, is that polymer rakes looses the kinetic energy one has in ones body to torque the tines while raking. Polymeric rakes tend to glide over the top surface of the lawn and do not reach down to ground level. Also, the half polymer and half metal rake have the same problem. Additionally, after several years the polymer rake tips tend to wear down to a nub when the leaves are on driveways and sidewalks and fail to function as a raking implement. Polymeric material has the advantages of lighter weight and lower production cost but do not provide sufficient rigidity; are to flexible to pull the debris over the lawn and tips aren't durable to provide years of service as are metal rakes. In a particularly preferred embodiment, the above advantages are accomplished by use of my description of the present invention.

Therefore, in the preferred embodiment, it is an object of the present invention to have all of the tines permanently attached which makes it unnecessary to produce and store replacement tines.

It is still another object of the present invention to provide a partial mulching (tearing effect) of the leaves.

It is yet another object of the present invention to provide a rake that will allow more efficient raking in leaf reduction per stroke as well as less strokes.

It is still another object of the present invention to provide a rake head for a lawn or garden that will thatch the raked surface so that a newly raked lawn will be allowed to breathe and remain green instead of turning brown from a built up layer of rhizomes. Rhizomes are a group of living and dead roots that grow horizontally and lay between the green layer of grass and the top of the soil. No other rake makes mention of this advantage but my invention causes a thatching effect that is very beneficial to one's lawn.

It is yet another object of the present invention to provide a triple row rake which is simple in design yet inexpensive to manufacture and has unitary construction made from a stiff material preferably metal, yet reinforced polymers or bamboo will suffice with fixed tines to reduce storing cost and breakage.

It is still a further object of the present invention to have a dogleg socket attached to the handle at approximately 15 degrees.

These and other objects and advantages are accomplished by a rake head of the present invention.

In accordance with one aspect of the present invention there is provided a rake head with a support member defining a first plane. An opening for attaching a thin elongated handle is provided on the main support frame of said rake head that is doglegged or bent approximately 15 degrees. A first plurality of tines is found in the main support frame. A second and third plurality of tines is found on the second plane attached to and parallel to the main support frame. The tines found on the second plurality being of different shank lengths creating in effect a second row and a third row of tines on a two plane raking implement. Being of a unitary construction provides an equal degree of range and motion. The length of the shank portion of all three rows are different thereby making the invention unique. The shank portion of the first row being the longest. The shank portion of the second row being second in length and the shank portion of the third row being the shortest. All three rows combined in a dual plane rake makes for a truly novel invention.

In accordance with another aspect of the present invention all pluralities of tines are laterally adjacent to and arranged in front to rears staggered fashion with dual planes being parallel.

BRIEF DESCRIPTION OF THE DRAWING

The description of this invention is to be read in conjunction with the following drawing. Please keep disclosure document No. 270665 filed Jan. 3, 1991 for references.

DETAILED DESCRIPTION OF PREFERRED EMBODIMENTS

Figure 1:
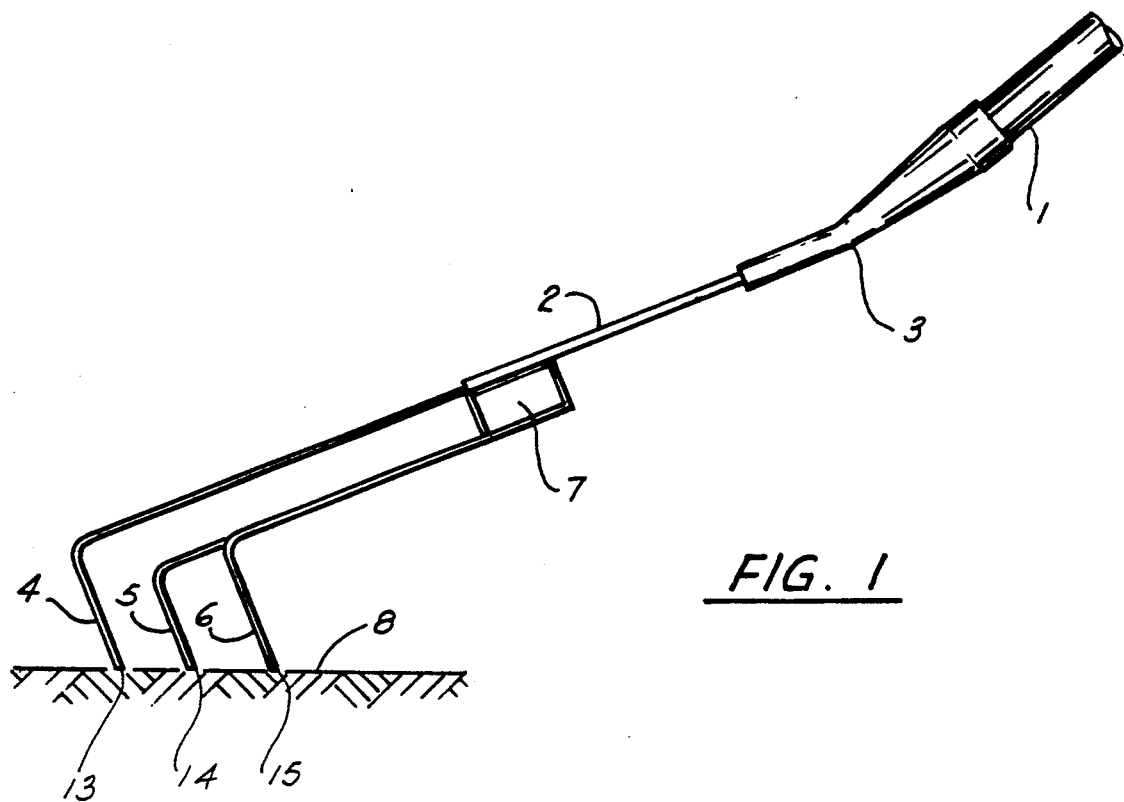
FIG. 1 is an elevation view of the multiple tine rake of this invention.

As illustrated in FIGS. 1, 2, 3, and 4, the tri-blade rake FIG. 1 according to the present invention includes a thin elongated handle #1 securely attached to the head of the rake 2 by means of a dogleg socket 3 bent at an angle of approximately 15 degrees for the handle 1. There is a first row of aligned tines 4 and a second plane FIG. 2 with pluralities of tines FIG. 3 with alternating long and short shanks 10 and 11. In the first row the tines are spaced approximately 1 cm. apart. The first row of plural tines has a shank 12 varying in length from approximately 14 to 15 cms. from outside to middle. All tines FIG. 4 have a tip portion 13, 14, 15 arranged so the tip is bent downwardly from the shanks 10, 11, 12. All tines in first row 4 second row 5 and third row 6 are the same width and are bent at the same angle. The tines of the second row 5 have lengths of shank portion 10 approximately 10 cm. The tines of the third row 6 have shanks of approximately 8 cm. The distance from shank curvature 9 to tip is approximately 3 to 4 cm. on all tines. The spacing between the tines of the second plane is the same as the spacing between the tines of the first row.

Figure 2:
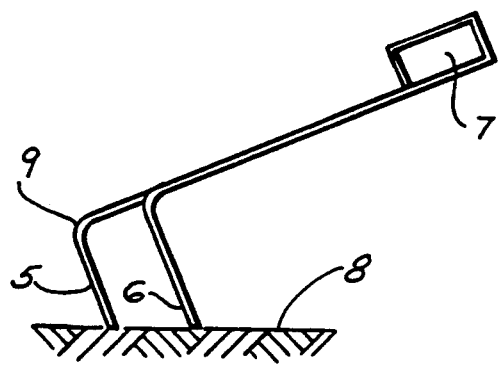
FIG. 2 is a side view of the second plane.
Figure 3:
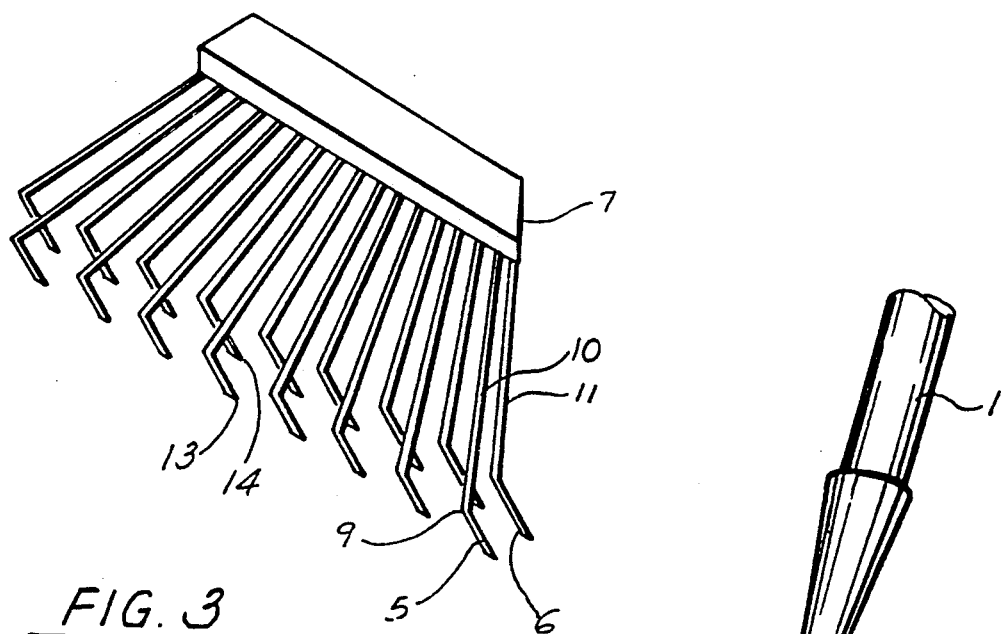
FIG. 3 is a front view of the second plane with alternating tines of different shank lengths.

The tines in the second plane are arranged in alternating fashion or in a first in second group, thereby, creating the second 5 and third row 6 of tines as shown in FIG. 2 and FIG. 3.

Figure 4:
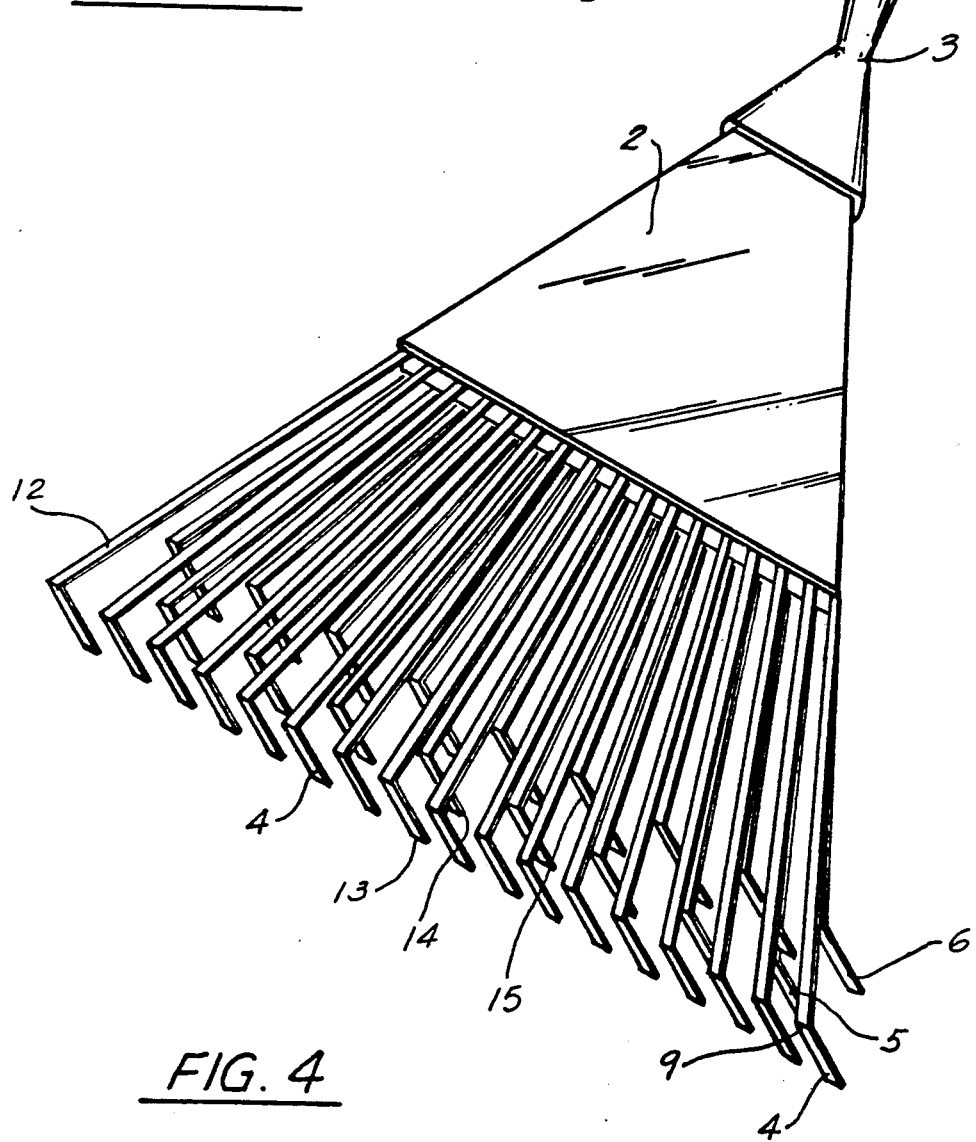
FIG. 4 is a front view of the assembled rake.

The main support frame #2 of the tri-blade rake FIG. 4 can be formed from any relatively high strength moldable or castable material such as metal or ploymers but bamboo will suffice. It is intended that the main support frame 2 can be formed by any simple injection or common lay up method using any stiff reinforced material.

The distance between main frame #2 and second plane FIG. 2 is approximately 2.5 cm. at point 7.

In operation the handle 1 of the rake FIG. 1 is designed to have a dogleg socket 3 so that all tines will touch the ground 8 more effectively to accomplish the object of this invention. As pressure is applied to the handle 1 the tip portions 13, 14, 15 exert a downward force on the grass that reaches the rhizome layer causing debris to be popped up and caught or raked by the said invention creating the thatching effect and object of the invention.

The principles, preferred embodiments and modes of operation of the present invention have been described in the foregoing specification. The invention which is intended to be protected herein, however, is not to be construed as limited to the particular embodiments disclosed, since these are regarded to be illustrative rather than restrictive. Variations and changes may be made by others without departing from the spirit and scope of the invention.

What is claimed is:

1. A rake head comprising:
   a) a dogleg socket bent at approximately 15 degrees for attaching a thin elongated handle,
   b) a substantially planar main frame support member defining the rake head and including a first plurality of tines attached thereto, thereby defining a first row of tines within a first plane,
   c) means for attaching a second plurality of tines to said support member, said second plurality of tines defining a second plane, said second plane being laterally adjacent to and substantially parallel to said first plane,
   d) said second plurality of tines within said second plane having alternating long and short shank portions disposed on said second plane, thereby creating a second and third row of tines spaced from said first row of tines and
   e) said tines of said first, second and third rows being arranged in front to rear laterally adjacent staggered fashion.

2. The rake head of claim 1, wherein each shank portion of said first, second and third rows of tines have different lengths.

3. The rake head of claim 1, wherein the angle between the shank portion of each tine and a corresponding tip portion is directed downwardly at approximately 90 degrees.

* * * * *